United States Patent
Asselin et al.

(10) Patent No.: US 9,027,014 B2
(45) Date of Patent: May 5, 2015

(54) UPDATING FIRMWARE COMPATIBILITY DATA

(71) Applicant: International Business Machines Corporation, Armonk, NY (US)

(72) Inventors: Albert A. Asselin, Morrisville, NC (US); William J. Piazza, Holly Springs, NC (US); David B. Roberts, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 204 days.

(21) Appl. No.: 13/744,029

(22) Filed: Jan. 17, 2013

(65) Prior Publication Data

US 2014/0201726 A1  Jul. 17, 2014

(51) Int. Cl.
  *G06F 9/445*  (2006.01)
  *G06F 9/44*  (2006.01)

(52) U.S. Cl.
  CPC .. *G06F 8/65* (2013.01); *G06F 8/71* (2013.01); *G06F 8/665* (2013.01)

(58) Field of Classification Search
  USPC ......................................................... 717/170
  See application file for complete search history.

(56) References Cited

U.S. PATENT DOCUMENTS

| | | | |
|---|---|---|---|
| 6,675,258 B1 * | 1/2004 | Bramhall et al. | ............. 711/114 |
| 7,178,141 B2 | 2/2007 | Piazza | |
| 7,984,436 B1 | 7/2011 | Murray | |
| 2005/0028146 A1 | 2/2005 | Quick | |
| 2008/0189693 A1 | 8/2008 | Pathak | |
| 2008/0209408 A1 | 8/2008 | Ganesan et al. | |
| 2008/0256530 A1 | 10/2008 | Armstrong et al. | |
| 2008/0301668 A1 | 12/2008 | Zachmann | |
| 2010/0169876 A1 | 7/2010 | Mann | |
| 2010/0173622 A1 | 7/2010 | Maurya et al. | |
| 2011/0072423 A1 | 3/2011 | Fukata | |
| 2011/0239208 A1 | 9/2011 | Jung et al. | |
| 2014/0040875 A1 * | 2/2014 | Bower et al. | .................. 717/170 |

OTHER PUBLICATIONS

"U.S. Appl. No. 13/788,404—Office Action" Date mailed: Nov. 19, 2014, 16 pages.

* cited by examiner

*Primary Examiner* — John Chavis
(74) *Attorney, Agent, or Firm* — Katherine S. Brown; Jeffrey L. Streets

(57) ABSTRACT

A computer program product including computer usable program code embodied on a tangible computer readable storage medium, wherein the computer program product includes computer usable program code for downloading a candidate version of a firmware image for a particular product, computer usable program code for updating incomplete firmware compatibility metadata by downloading additional firmware compatibility metadata for the particular product, and computer usable program code for using the updated firmware compatibility metadata to determine whether the candidate version of the firmware image is compatibility with a current version of a firmware image that is installed within the particular product.

16 Claims, 4 Drawing Sheets

FIRMWARE COMPATIBILITY METADATA TABLE
(PRODUCT XYZ)

24

Candidate Firmware Version
26

|   | A | B | C | D | E | F | G |
|---|---|---|---|---|---|---|---|
| A | ▨ | ✓ |   | ✗ | ✗ | ✗ | ✗ |
| B | ✓ | ▨ | ✓ |   |   | ✗ | ✗ |
| C |   | ✓ | ▨ | ✓ |   | ✓ |   |
| D | ✗ |   | ✓ | ▨ | ✓ |   | ✓ |
| E | ✗ |   |   | ✓ | ▨ | ✓ | ✓ |
| F | ✗ | ✗ |   |   | ✓ | ▨ | ✓ |
| G | ✗ | ✗ | ✗ | ✗ |   | ✓ | ▨ |

Current Firmware Version 34
32
36

29 28 27

✓ = Compatible
✗ = Incompatible

FIG. 3

UPDATING FIRMWARE COMPATIBILITY DATA

BACKGROUND

1. Field of the Invention

The present invention relates in general to firmware for systems and electronic devices and, in particular, to firmware upgrades. More particularly, the present invention relates to a method for identifying if a candidate firmware is compatible with an existing, or installed, firmware installation.

2. Background of the Related Art

Firmware is software codes which reside in a piece of hardware and are responsible for an integral portion of the hardware function and are generally treated as being a component of the hardware. Typically, firmware is stored as binary information in some form of nonvolatile memory component, in which binary can be represented in hexadecimal, octal and other number bases. The components of firmware may be executable programs, such as power-on self test (POST), Basic Input/Output Software (BIOS), configuration utilities, etc., or it may be data tables, e.g., a description of the geometry of a hardfile, register values to use with a universal asynchronous receiver-transmitter (UART) to produce different baud rates, etc. Firmware is typically stored in a special type of memory chip that doesn't lose its storage capabilities when power is removed or lost. This non-volatile memory is classified as "read-only" memory (ROM) because the user, during normal operation, cannot change the information stored there. Generally, ROMs are programmed at the "factory", i.e., by the ROM manufacturer utilizing information provided by a customer. A basic type of memory device utilized to store firmware is called a programmable read only memory (PROM), which is programmable by any technician utilizing, e.g., a programming console. A basic PROM receives one version of firmware and the firmware code is "burned in" to the PROM and cannot be changed. To update the firmware, the PROM must be physically removed from the device and replaced with a new PROM that contains the upgraded firmware. Improvements in memory device technologies have rendered variations of the PROM, such as erasable programmable read only memory (EPROM) and electrically erasable programmable read only memory (EEPROM) devices, that can be erased utilizing electrical signals without the need to remove them from a circuit.

Many products experience a number of firmware revisions that correct firmware defects, compensate for hardware or operating system errors or introduce new features. As long as the hardware architecture of the subsystem does not change substantially and each new firmware revision is capable of recognizing and dealing with differences in hardware revisions levels, things are relatively simple for the flash utility that replaces the present installed firmware image with a upgrade firmware image. The flash utility may assume that the progression of build IDs, such as QYKT24AUS, QYKT25AUS, etc., is valid and that older revisions may be applied over newer revisions, i.e., the level of the flash may regress, albeit with the possible loss of function and re-introduction of firmware defects.

However, certain events in the life-cycle of a product family break these simple assumptions. These events may include:

(1) Major changes in the architecture of a product, e.g., as a result of cost reduction changes, such that older versions of firmware do not recognize newer hardware features and therefore treat them improperly.

(2) The divergence of a product family into 2 or more related families, possibly under the control of two different engineering teams located, e.g., in distant cities, where the firmware may look similar but has actually been customized for a specific set of hardware.

(3) The convergence of two product families (from a firmware perspective). Convergence can be used as a cost reduction tool where two similar pieces of firmware exist and can be combined into a single firmware image that works on both hardware platforms but requires only a single development group to maintain and test it.

(4) A characteristic of a product, e.g., the layout of configuration information in CMOS memory, changes in such a way that older levels of firmware would misinterpret it.

Generally, systems and subsystems with updateable firmware typically require some sort of verification to determine applicability of a candidate image to an existing installation. Conventional methods quite often amount to nothing more than verifying some or all of the following: (i) a company's copyright notice exists in the candidate image; (ii) a part number in a recognizable form and position exists in the candidate image; (iii) a "type code" exists in the candidate image in a recognizable form and position and the type code indicates that the old and new images are compatible (type codes identify compatible types of hardware and may be applied to the overall product or to subsystems within the product); (iv) a revision level exists in the candidate image and that the user is attempting to apply a newer image over an older image; and (v) the candidate image has not been corrupted, e.g., verified by using a checksum or CRC. Items (i), (ii), and (iv) above do little (if anything) to aid in verifying compatibility between firmware images. They allow software utilities to verify that the firmware images came from a single vendor and that the user is not attempting to regress to an older firmware image. Even then, there are times when it may be desirable to regress so that a warning with a mechanism to override the protection is usually provided.

Type codes have sometimes been used to indicate compatibility between firmware images, but such practices have limitations. Conventional techniques either do not utilize such type codes, in which case it is possible to inadvertently apply the wrong type of firmware image to a product, or assume that only firmware images within the same type code are compatible. Additionally, conventional techniques will often require that an exact match exist between a single type code in the candidate image and a single type code in the installed image. Furthermore, these techniques may also commonly assume that any new firmware images that present the same type code as an installed firmware image is compatible and may be utilized to update the installed image. These "simple" schemes often cause problems in the real world where complicated scenarios may arise.

BRIEF SUMMARY

One embodiment of the present invention provides a method of determining the compatibility of a firmware version. The method includes downloading a candidate version of a firmware image for a particular product, updating incomplete firmware compatibility metadata by downloading additional firmware compatibility metadata for the particular product, and using the updated firmware compatibility metadata to determining whether the candidate version of the firmware image is compatibility with a current version of a firmware image that is installed within the particular product.

Another embodiment of the invention provides a computer program product including computer usable program code embodied on a tangible computer usable storage medium. The computer program product includes computer usable program code for downloading a candidate version of a firmware image for a particular product, computer usable program code for updating incomplete firmware compatibility metadata by downloading additional firmware compatibility metadata for the particular product, and computer usable program code for using the updated firmware compatibility metadata to determining whether the candidate version of the firmware image is compatibility with a current version of a firmware image that is installed within the particular product.

BRIEF DESCRIPTION OF THE SEVERAL VIEWS OF THE DRAWINGS

FIG. 3 is a diagram of firmware compatibility metadata in the form of a matrix.

DETAILED DESCRIPTION

Figure 1:
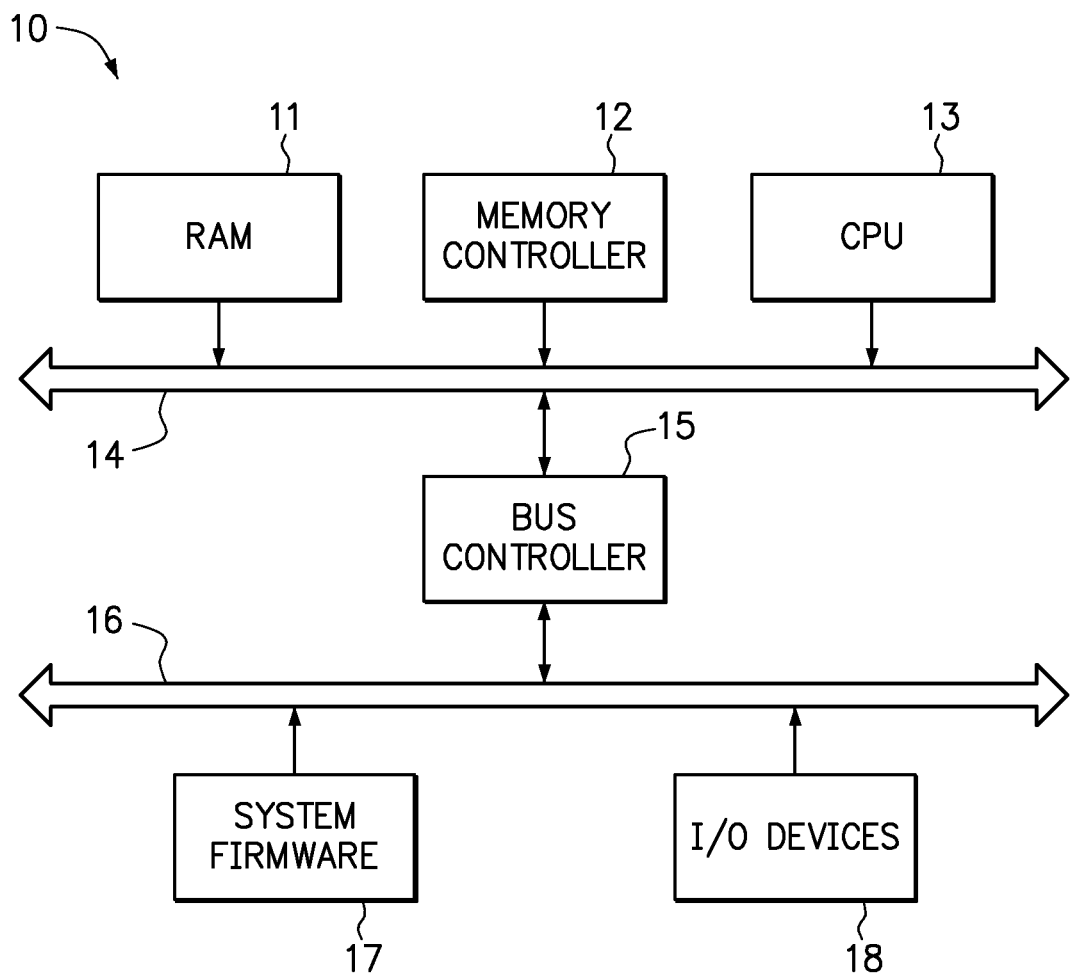
FIG. 1 is a simplified high-level block diagram of an exemplary data processing system that provides a suitable environment for the practice of the present invention.

One embodiment of the present invention provides a method of determining the compatibility of a firmware version. The method includes downloading a candidate version of a firmware image for a particular product, updating incomplete firmware compatibility metadata by downloading additional firmware compatibility metadata for the particular product, and using the updated firmware compatibility metadata to determining whether the candidate version of the firmware image is compatibility with a current version of a firmware image that is installed within the particular product.

Embodiments of the method of the present invention may be implemented in a flash utility (application program) that can over-write the current firmware image with a different firmware image. However, in accordance with embodiments of the present invention, the flash utility may be responsible for handling, updating, and using firmware compatibility metadata. Although the firmware compatibility metadata may be stored along with the firmware image, for example in a non-volatile memory device like an EPROM or EEPROM, the flash utility can read and write to the firmware compatibility metadata.

The candidate version of the firmware image may, for example, be downloaded from a website maintained by the manufacturer of the particular product. Typically the candidate version will be an upgrade from the current version of the firmware image that is installed within the particular product. However, such websites may also maintain a number of versions, including the current and previous versions of the firmware image. Previous version may be helpful for back-leveling or enabling a compatible path from a current version to a desired version.

Embodiments of the invention recognize that the firmware compatibility metadata stored along with the firmware may be incomplete. For example, the metadata may have been obtained at the same time as the current firmware image, and the user is now downloading a more-recent candidate version. Accordingly, the earlier metadata does not indicate whether the more-recent candidate version is compatible with the current firmware image. Furthermore, current firmware compatibility metadata for one or more candidate versions of the firmware may also be incomplete due to testing limitations. Therefore, embodiments of the invention include updating incomplete firmware compatibility metadata by downloading additional firmware compatibility metadata for the particular product. The metadata may be obtained from various sources, such as a website run by a testing lab, a user group, a firmware developer, or the product manufacturer. Furthermore, the metadata may be in various forms, such as in extensible markup language. In a first option, the entire file of firmware compatibility metadata is replaced with a newer file. In a second option, the flash utility may only request additional metadata for firmware combinations whose compatibility is not presently identified in the firmware compatibility metadata stored with the firmware in the particular product. In a third option, the flash utility may only request or download the compatibility metadata for a specific candidate firmware image that has been identified or downloaded. In any of these options, the metadata may be downloaded separate from the firmware itself, and may also be downloaded from a different source at a different time.

The updated firmware compatibility metadata preferably includes an indication of compatibility or incompatibility between the candidate version and the current version of the firmware image. Alternatively, the updated firmware compatibility metadata may include an indication of a proven sequence of compatible firmware between two firmware versions. In other words, if a direct upgrade from version D to version G is not known to be compatible or incompatible, there may still be sufficient metadata to determine that it is possible to obtain version G by sequentially upgrading from version D to version F and then upgrading further from version F to version G.

Embodiments of the invention may include further action after determining the compatibility of the candidate firmware. For example, the method may prevent installation of a candidate firmware image if the updated firmware compatibility metadata indicates that the candidate firmware image is incompatible with the current firmware image. Similarly, the method may allow or initiate installation of a candidate firmware image if the updated firmware compatibility metadata indicates that the candidate firmware image is compatible with the current firmware image.

Still further, the method may include determining a path from the current firmware version to a desired firmware version. Such a path will include a sequence of firmware versions, where the firmware compatibility metadata indicates that each subsequent firmware version in the sequence is compatible with each previous firmware version in the sequence. The path may allow an upgrade from the currently-installed firmware version to a more recent firmware version, or the path may allow regression or back-leveling from the currently-installed firmware version to a previous firmware version. Optionally, the method may include automatically downloading intermediate versions of the firmware image that are needed in order to follow a compatible upgrade or back-leveling sequence.

In a further embodiment, firmware compatibility metadata may be stored as a matrix of known compatibility paths. Whether those paths are direct paths from one version to another version, or where the paths go through intermediate versions, the metadata may be represented as a compatibility matrix. The matrix may include any known compatibility or incompatibility data, but parts of the matrix may also be unknown. As more and more compatibility experience or testing is completed, the matrix may become more complete over time due to periodic updating of the firmware compatibility metadata.

Another embodiment of the invention provides a computer program product including computer usable program code embodied on a tangible computer usable storage medium. The computer program product includes computer usable program code for downloading a candidate version of a firmware image for a particular product, computer usable program code for updating incomplete firmware compatibility metadata by downloading additional firmware compatibility metadata for the particular product, and computer usable program code for using the updated firmware compatibility metadata to determining whether the candidate version of the firmware image is compatibility with a current version of a firmware image that is installed within the particular product. It should be recognized that the computer program product may include further computer usable program code to implement any one or more step or feature of the methods described herein.

FIG. 1 is a simplified high-level block diagram of an exemplary data processing system 10 that provides a suitable environment for the practice of the present invention. The data processing system 10, such as a personal computer or server, includes a random access memory (RAM) 11, memory controller 12 and a central processing unit (CPU) 13 that are interconnected utilizing a system bus 14. A bus controller 15 provides a means for arbitrating the data flow between system bus 14 and an input/output bus 16. Data processing system 10 also includes a plurality of I/O devices, generally designated 18, such as disk drives and network cards, and a system firmware 17 that is typically resident in a programmable read only memory (PROM) device, such as an electrically erasable programmable read only memory (EEPROM). It should be noted that although the data processing system 10 has been described in the context of a computer system, the present invention does not contemplate limiting its practice to this one particular embodiment. The present invention may be advantageously practiced in any system and/or device, such as Ethernet cards, that utilizes firmware in its setup and operational phases.

Figure 2:
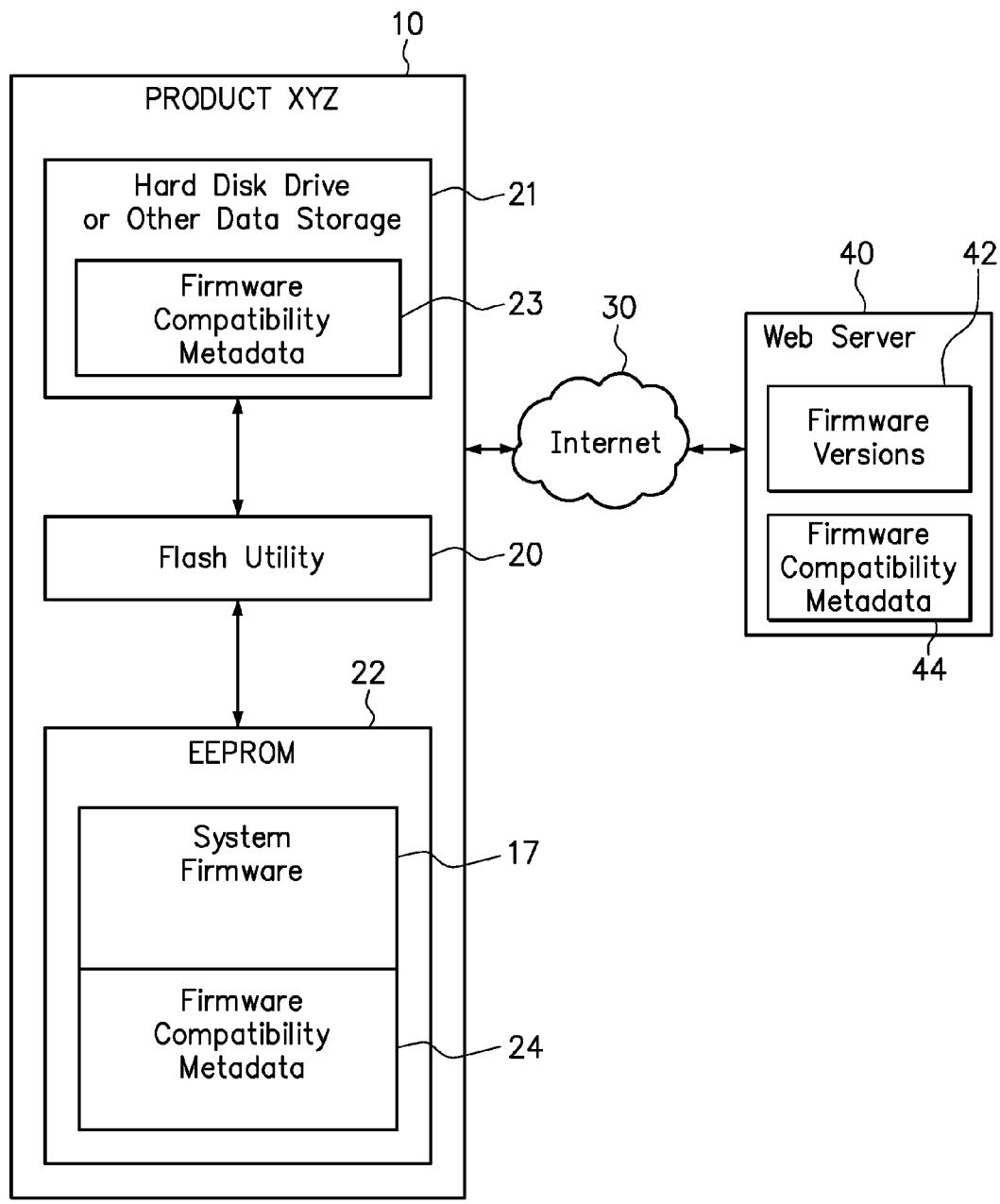
FIG. 2 is a diagram of a flash utility application program in communication with the system firmware.

FIG. 2 is a diagram of a flash utility application program in communication with the system firmware in accordance with one embodiment of the invention. The flash utility application program 20 is run in the data processing system 10, otherwise referred herein to as a product. The flash utility 20 can read from, and write to, a hard disk drive or other data storage device 21 that may store the firmware compatibility metadata 23 or an EEPROM 22 that may store the system firmware 17 and the firmware compatibility metadata 24. In embodiments where the firmware compatibility metadata is stored on a hard disk drive, the metadata may be called into RAM memory of the processor in the product 10 for the duration of the upgrade process, and then erased from the RAM memory. The flash utility 20 can also communicate with a web server 40 over a global communications network, such as the Internet 30. Candidate firmware images 42 may be downloaded to the flash utility 20 in this manner. Similarly, firmware compatibility metadata 44 may be downloaded to the flash utility 20 in order to update the firmware compatibility metadata 23 stored on the hard disk drive 23 or the firmware compatibility metadata 24 stored in the EEPROM 22. It should be recognized that the candidate firmware images 42 and the firmware compatibility metadata 44 may be obtained from different and separate sources.

FIG. 3 is a diagram of firmware compatibility metadata 24 in the form of a matrix or table. The illustrated metadata is only for a particular product, PRODUCT XYZ. The columns provide data corresponding to a candidate firmware version and the rows provide data corresponding to a current firmware version. When a candidate firmware version has been identified, such as by downloading the candidate version to the flash utility, and a current firmware version is also known to the flash utility, the cell at the intersection of the corresponding column and row will provide the available compatibility data, if any. For example, an upgrade to version G (column G) from a current version A (row A) yields an "X" at point 26, which indicates that the candidate G is incompatible with current version A. As another example, back-leveling from a current version G (row G) to version F (column F) is shown at point 27 to be compatible (shown as a "✓"), but back-leveling further to version E (column E) is shown at point 28 to be unknown (the cell is blank) and back-leveling to version D (column D) is shown at point 29 to be incompatible.

In yet another example, the metadata 24 is used to identify a path from one version to another version. If the current version of the firmware is version C (row C) and the user has caused the flash utility to download a candidate firmware version G (column G), the cell at point 32 shows that compatibility is unknown. The flash utility would preferred not to use, and may prevent use of, a firmware version with an unknown compatibility. However, the metadata 24 shows at point 34 that candidate version F (column F) is compatible with current version C (column C), and that after version F becomes the current version (row F) then the candidate version G (column G) is known to be compatible (see point 36). Accordingly, a compatible path is a sequence from version C to version F and then to version G.

Figure 4:
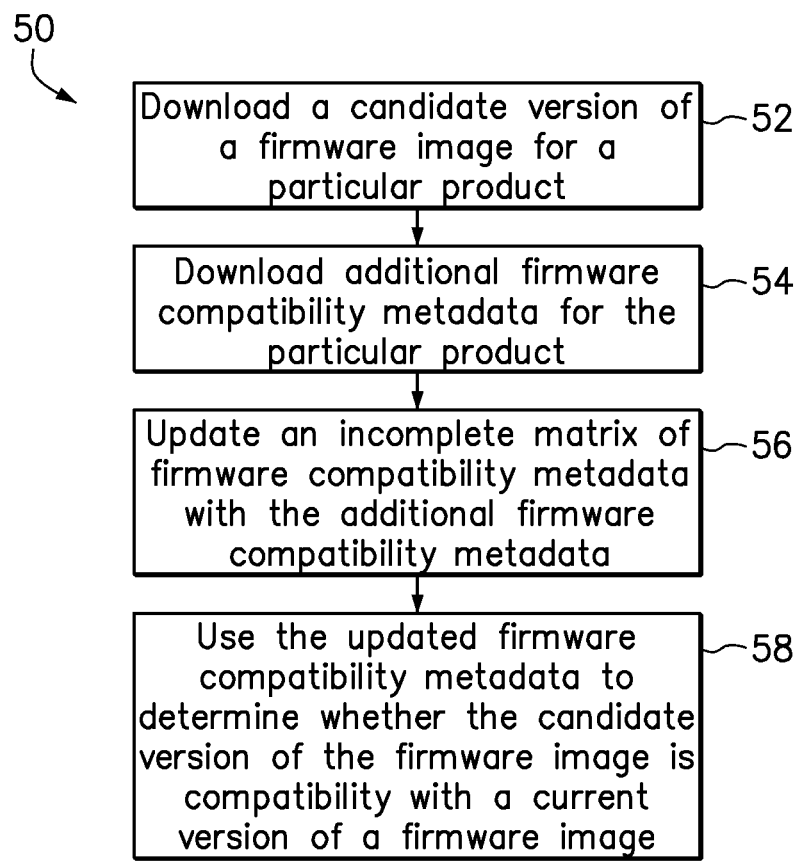
FIG. 4 is a flowchart of a method in accordance with one embodiment of the invention.

FIG. 4 is a flowchart of a method 50 in accordance with one embodiment of the invention. In step 52, a candidate version of a firmware image for a particular product is downloaded to the particular product. In step 54, additional firmware compatibility metadata for the particular product is downloaded. Accordingly, an incomplete matrix of firmware compatibility metadata may be updated with the additional firmware compatibility metadata in step 56. The updated firmware compatibility metadata may be used, in step 58, to determine whether the candidate version of the firmware image is compatibility with a current version of a firmware image.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product including computer usable program code embodied on a non-transitory computer readable storage medium, the computer program product comprising:

computer usable program code for downloading a candidate version of a firmware image for a particular product;

computer usable program code for updating incomplete firmware compatibility metadata by downloading additional firmware compatibility metadata for the particular product; and computer usable program code for using the updated firmware compatibility metadata to determine whether the candidate version of the firmware image is compatible with a current version of a firmware image that is installed within the particular product.

2. The computer program product of claim 1, wherein the updated firmware compatibility metadata includes an indication of compatibility or incompatibility between two firmware versions.

3. The computer program product of claim 1, wherein the updated firmware compatibility metadata includes an indication of a proven sequence of compatible firmware between two firmware versions.

4. The computer program product of claim 1, further comprising:
   computer usable program code for preventing a firmware installation if the updated firmware compatibility metadata indicates that the candidate firmware image is incompatible.

5. The computer program product of claim 1, further comprising:
   computer usable program code for allowing a firmware installation if the updated firmware compatibility metadata indicates that the candidate firmware image is compatible.

6. The computer program product of claim 1, further comprising:
   computer usable program code for determining a path from the current firmware version to a desired firmware version, wherein the path includes a sequence of firmware versions, wherein the firmware compatibility metadata indicates that each subsequent firmware version in the sequence is compatible with each previous firmware version in the sequence.

7. The computer program product of claim 6, wherein the path allows an upgrade from the currently-installed firmware version to a more recent firmware version.

8. The computer program product of claim 6, wherein the path allows regression from the currently-installed firmware version to a previous firmware version.

9. The computer program product of claim 6, further comprising:
   computer usable program code for automatically downloading intermediate versions of the firmware image that are needed in order to install the sequence of firmware versions.

10. The computer program product of claim 1, wherein downloading firmware compatibility metadata includes downloading firmware compatibility metadata over the worldwide web.

11. The computer program product of claim 1, wherein the firmware compatibility data is downloaded separately from the firmware.

12. The computer program product of claim 11, wherein the firmware compatibility data was developed at a time later than the firmware was downloaded.

13. The computer program product of claim 1, wherein the metadata is downloaded as an extensible markup language file.

14. The computer program product of claim 1, wherein the updated firmware compatibility metadata is stored as a matrix of known compatibility paths.

15. The computer program product of claim 14, wherein the matrix becomes more complete over time due to periodic updating of the firmware compatibility metadata.

16. The computer program product of claim 1, further comprising:
   computer usable program code for storing the updated firmware compatibility metadata along with the firmware currently-installed on the product.

* * * * *